3,015,668
PROCESS FOR PRODUCING CYCLOMATIC MANGANESE TRICARBONYL COMPOUNDS
John Kozikowski, Walled Lake, Mich., assignor to Ethyl Corporation, New York, N.Y., a corporation of Delaware
No Drawing. Filed Nov. 24, 1959, Ser. No. 855,016
4 Claims. (Cl. 260—429)

This invention relates to a novel process for forming organometallic compounds. More specifically, it relates to a process for forming cyclomatic manganese tricarbonyl compounds wherein the cyclomatic radical donates five electrons for pi-bonding with the manganese atom, and the manganese atom by virtue of the five electrons donated to it from the cyclomatic radical and the six electrons donated to it by the three carbonyl groups has an electron configuration which is isoelectronic with that of krypton.

It is an object of this invention to provide a novel process for forming cyclomatic manganese tricarbonyl compounds. Additional objects of this invention will become apparent from a reading of the specification and claims which follow.

The objects of this invention are accomplished by providing a process for forming cyclomatic manganese tricarbonyl compounds. These compounds have the general formula $$CyMn(CO)_3$$

Cy, in the above formula, represents a cyclomatic hydrocarbon radical which is a hydrocarbon containing a cyclopentadienyl radical. Typical of such hydrocarbon radicals are those represented by the formulae:

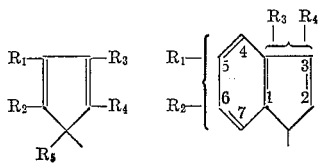

where the R's are selected from the group consisting of hydrogen and univalent organic hydrocarbon radicals. A preferred class of cyclomatic radicals are those which contain from five to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. These radicals are preferred since they are derived from the more readily available cyclomatic compounds. Further, cyclomatic manganese tricarbonyl compounds containing these groups have the more desirable characteristics of volatility and solubility which are prerequisites for superior hydrocarbon additives.

In the compounds formed by my process the manganese atom has an electron configuration which is isoelectronic with that of krypton. In other words, the atomic number of manganese plus the number of electrons donated to it—eleven—equals the atomic number of krypton. In each of the compounds formed by my process, six electrons are donated to the manganese atom from the three carbonyl groups, and five electrons are donated to the manganese atom from the cyclomatic radical.

Although not bound by any theory, my process may be schematically represented by way of the following equation:

$$Mn(CO)_5X + CyZ \rightarrow CyMn(CO)_3 + ZX$$

where Cy represents a cyclomatic radical as hereinbefore described; Z is an alkali metal, e.g. sodium, potassium, cesium or rubidium and X is a halogen, such as chlorine, bromine, iodine or fluorine.

The process may be carried out at temperatures between about 20 to about 200° C. Preferably temperatures of about 25 to about 100° C. are used since, within the range, relatively higher yields are obtained with a minimum of undesirable side reactions. The pressure is not critical, but preferably is atmospheric or slightly higher.

The process is generally conducted under a blanket of inert gas such as nitrogen, helium, argon and the like.

The process is conducted in the presence of a non-reactive solvent. The nature of the solvent is not critical. Typical solvents are high boiling saturated hydrocarbons such as n-octane, n-decane, and other paraffinic hydrocarbons having up to about 20 carbon atoms such as pentadecane, and the like. Typical ether solvents are ethyl octyl ether, diethylene glycol methyl ether, diethylene glycol dibutyl ether, ethylene glycol dimethyl ether, ethylene glycol diethyl ether, tetrahydrofuran, ethylene glycol dibutyl ether and the like. Silicone oils such as the dimethyl polysiloxanes, bis(chlorophenyl) polysiloxanes, hexapropyldisilane, and diethyldipropyldiphenyldisilane may also be used. Solvents which are preferred are the high boiling ethers such as tetrahydrofuran and ethylene glycol dimethylether. All of the above solvents will not be suitable for all of the specific embodiments of the invention since certain of the reactants are relatively insoluble in some of the above solvents. Thus, care should be used in selecting the specific solvent for the specific reaction.

The solvent should be one having the requisite boiling and/or freezing point, for control of reaction temperature and ease of separation of the product.

It is preferable to select a solvent whose normal boiling point varies by at least 25° C. from the normal boiling point of a liquid product, and the freezing point of the solvent be at least 25° C. less than the temperature at which separation of a solid product is effected through crystallization.

The process is preferably conducted with agitation of the reaction mixture.

The time required for the process varies depending on the other reaction variables. In general from about 30 minutes to about 24 hours is sufficient.

In general, the metal carbonyl halide reactant employed in the process is more expensive than the cyclomatic-alkali metal reactant. In order to insure maximum conversion of the metal carbonyl halide, it is, therefore, preferred to use excess quantities of the alkali metal-cyclomatic reactant. Generally, from about one to about 1.5 moles of the alkali metal cyclomatic compound are employed for each mole of manganese carbonyl halide reactant since, within this range, a good conversion of the metal carbonyl halide is obtained. In some cases, alkali metal cyclomatic reactant may be more expensive than the particular carbonyl halide employed. In these instances, excess manganese carbonyl halide will be employed to insure complete conversion of the alkali metal cyclomatic compound.

To further illustrate the compounds of the invention and their mode of preparation, there are presented the following examples in which all parts and percentages are by weight unless otherwise indicated.

*Example I*

Cyclopentadienyl sodium (0.03 mole) was prepared by reacting (under nitrogen) cyclopentadiene with sodium dispersed in tetrahydrofuran. This solution was added slowly (under nitrogen) to a tetrahydrofuran solution containing 8.25 parts (0.03 mole) of manganese pentacarbonyl bromide. Very little heat was evolved, but a finely-divided solid was formed, and carbon monoxide was slowly evolved. The solvent was removed under reduced pressure and the residues sublimed at 70° C. and a pressure of less than one mm. The product was found to contain cyclopentadienyl manganese tricarbonyl and dimanganese decacarbonyl. The presence of cyclopentadienyl manganese tricarbonyl was confirmed by taking a mixed melting point with an authentic sample of this compound. The same procedure was used to characterize and identify the dimanganese decacarbonyl. The crystals of cyclopentadienyl manganese tricarbonyl and manganese carbonyl were separated mechanically to give essentially pure cyclopentadienyl manganese tricarbonyl.

*Example II*

A solution comprising 1.1 mole of methylcyclopentadienyl sodium and one mole of chloromanganese pentacarbonyl in tetrahydrofuran is agitated under nitrogen for 30 minutes after which it is heated at reflux under nitrogen until no further evolution of carbon monoxide is observed. The reaction product is then discharged and filtered and the filtrate is heated under reduced pressure to remove the solvent. The residue is then distilled under reduced pressure to give a good yield of methylcyclopentadienyl manganese tricarbonyl.

*Example III*

A solution comprising 1.5 moles of indenyl sodium, and one mole of chloromanganese pentacarbonyl in tetrahydrofuran is heated at reflux under a nitrogen atmosphere for 24 hours while agitating the reaction mixture. The reaction product is then discharged, filtered and the filtrate is heated under reduced pressure to remove the solvent. The residue is then distilled under reduced pressure to give a good yield of indenyl manganese tricarbonyl.

*Example IV*

To a solution comprising one mole of ethylcyclopentadienyl sodium in diethylene glycol dimethylether solvent is added incrementally over a one-hour period, one mole of iodomanganese pentacarbonyl. During the addition of the iodomanganese pentacarbonyl, the reaction mixture is heated at reflux under nitrogen. After refluxing for a total time of one hour and 15 minutes, the reaction mixture is discharged, filtered, and the excess solvent is removed by heating the filtrate under reduced pressure. The residue is then distilled to give a good yield of ethylcyclopentadienyl manganese tricarbonyl.

In my process a preferred cyclomatic-alkali metal reactant is a cyclomatic-sodium. Preferred manganese pentacarbonyl halide reactants are manganese pentacarbonyl chloride and manganese pentacarbonyl bromide. Their use enables a higher yield of product while minimizing undesirable side reactions.

The compounds produced by my process are extremely potent antiknocks. As such, they may be employed in gasoline in a quantity ranging from about 0.1 to about 6.0 grams per gallon of manganese as a cyclomatic manganese tricarbonyl compound. Also, they may be employed as additives to leaded gasoline containing from one to about eight grams per gallon of lead as a tetraalkyllead antiknock. When used as additives to a leaded gasoline, the gasoline may also contain a scavenging amount of a halohydrocarbon such as ethylene dichloride or ethylene dibromide. The antiknock effectiveness of my products and many formulations in which they are used is described in detail in U.S. Patent 2,818,417.

The compounds produced by my process have many other utilities. For example, they may be utilized in the gaseous plating of metals by decomposing the compound in an enclosed space so as to form a metal coating on an object contained within the enclosed space. The plating operation is customarily carried out in the presence of an inert atmosphere to reduce oxidation of the object to be coated or the coating metal itself.

Another utility for the compounds produced by my process is additives to home heater fuels, diesel fuels and fuels employed for jet engines. In this application, the effect of the additive is to reduce smoke and/or soot formation. Still another utility for the cyclomatic manganese tricarbonyl compounds is as additives to lubricants. In this application, the additive acts to increase the lubricity of the lubricating medium and reduce wear of the rubbing surfaces.

Having fully defined my novel process, the compounds produced by it and their manifold utilities, I desire to be limited only within the lawful scope of the appended claims, which, as is evident from the above description, comprises the reaction of a cyclomatic-alkali metal compound with a manganese pentacarbonyl halide in the presence of an inert solvent and under a blanketing atmosphere of an inert gas to yield a cyclomatic manganese tricarbonyl compound.

I claim:

1. A process comprising reacting a cyclomatic-alkali metal compound in which the cyclomatic group is a hydrocarbon group containing from 5 to about 13 carbon atoms with a manganese pentacarbonyl halide in the presence of an inert solvent and under a blanketing atmosphere of an inert gas to yield a cyclomatic manganese tricarbonyl compound in which the cyclomatic group is a hydrocarbon group containing from about 5 to about 13 carbon atoms.

2. The process of claim 1 wherein the cyclomatic-alkali metal reactant is a cyclomatic-sodium compound.

3. The process of claim 1 wherein the manganese pentacarbonyl halide is manganese pentacarbonyl bromide.

4. The process of claim 1 wherein the manganese pentacarbonyl halide is manganese pentacarbonyl chloride.

References Cited in the file of this patent

UNITED STATES PATENTS

| | | |
|---|---|---|
| 2,818,416 | Brown et al. | Dec. 31, 1957 |
| 2,818,417 | Brown et al. | Dec. 31, 1957 |
| 2,870,180 | Kozikowski et al. | Jan. 20, 1959 |

OTHER REFERENCES

Pauson: "Quarterly Reviews," vol. 9, 1955, p. 406.